(12) United States Patent
Erhard

(10) Patent No.: US 11,030,779 B2
(45) Date of Patent: Jun. 8, 2021

(54) DEPTH-ENHANCED TOMOSYNTHESIS RECONSTRUCTION

(71) Applicant: KONINKLIJKE PHILIPS N.V., Eindhoven (NL)

(72) Inventor: Klaus Erhard, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 159 days.

(21) Appl. No.: 16/094,034

(22) PCT Filed: May 19, 2017

(86) PCT No.: PCT/EP2017/062073
§ 371 (c)(1),
(2) Date: Oct. 16, 2018

(87) PCT Pub. No.: WO2017/202712
PCT Pub. Date: Nov. 30, 2017

(65) Prior Publication Data
US 2019/0114815 A1    Apr. 18, 2019

(30) Foreign Application Priority Data

May 24, 2016    (EP) .................................... 16171075

(51) Int. Cl.
*G06T 11/00*    (2006.01)
(52) U.S. Cl.
CPC ....... *G06T 11/008* (2013.01); *G06T 2211/424* (2013.01); *G06T 2211/436* (2013.01)
(58) Field of Classification Search
None
See application file for complete search history.

(56) References Cited

U.S. PATENT DOCUMENTS 5,936,628 A *    8/1999    Kitamura ................ G06T 17/20
                                                    345/420
7,167,172 B2 *    1/2007    Kaus ........................ G06T 7/12
                                                    345/418

(Continued)

FOREIGN PATENT DOCUMENTS

| JP | 2002236910 A | 8/2002 |
|----|--------------|--------|
| WO | 201356733 | 4/2013 |
| WO | 2015189811 | 12/2015 |

OTHER PUBLICATIONS

Haneda, et al. ("Clinical image benefits after model-based reconstruction for low dose dedicated breast tomosynthesis", Progress in Biomedical Optics and Imaging, SPIE, vol. 9412, Mar. 18, 2015). Provided by applicant. (Year: 2015).*

(Continued)

*Primary Examiner* — Anand P Bhatnagar
(74) *Attorney, Agent, or Firm* — Larry Liberchuk

(57) ABSTRACT

An Image processing system (IPS) and related method and imaging arrangement (IAR). The system (IPS) comprises an input interface (IN) for receiving i) a 3D input image volume (V) previously reconstructed from projection images ($\pi$) of an imaged object (BR) acquired along different projection directions and ii) a specification of an image structure in the input volume (V). A model former (MF) of the system (IPS) is configured to form, based on said specification, a 3D model (m) for said structure in the input 3D image volume. A volume adaptor (VA) of the system (IPS) is configured to adapt, based on said 3D model (m), the input image volume to so form a 3D output image volume (V').

12 Claims, 5 Drawing Sheets

(56) References Cited

U.S. PATENT DOCUMENTS

| | | | |
|---|---|---|---|
| 8,446,408 B2* | 5/2013 | Grass | G06T 11/005 |
| | | | 345/419 |
| 8,493,448 B2* | 7/2013 | Burazerovic | H04N 13/261 |
| | | | 348/157 |
| 9,008,398 B2* | 4/2015 | Mostafavi | G06T 5/002 |
| | | | 382/131 |
| 9,087,400 B2 | 7/2015 | Erhard | |
| 9,965,873 B2 | 5/2018 | Grady | |
| 10,679,104 B2* | 6/2020 | Mostafavi | G06T 7/248 |
| 2003/0007593 A1* | 1/2003 | Heuscher | A61B 6/541 |
| | | | 378/4 |
| 2011/0150178 A1 | 6/2011 | Bernard | |
| 2013/0121551 A1* | 5/2013 | Poulsen | G06T 17/00 |
| | | | 382/131 |
| 2013/0202168 A1 | 8/2013 | Jerebko | |
| 2016/0029987 A1* | 2/2016 | Langan | A61B 6/025 |
| | | | 378/8 |
| 2018/0018757 A1* | 1/2018 | Suzuki | A61B 6/03 |
| 2018/0033143 A1* | 2/2018 | Buelow | A61B 6/463 |
| 2018/0220984 A1 | 8/2018 | Brauner | |
| 2019/0114815 A1* | 4/2019 | Erhard | G06T 11/008 |

OTHER PUBLICATIONS

Lu, et al., ("Multiscale Regularized Reconstruction for Enhancing Microcalcification in Digital Breast Tomosynthesis", Optical Sensing, II, vol. 8313, Feb. 23, 2012). Provided by applicant. (Year: 2012).*

Haneda, et al., "Clinical image benefits after model-based reconstruction for low dose dedicated breast tomosynthesis", Progress in Biomedical Optics and Imaging, SPIE, vol. 9412, Mar. 18, 2015.

Lu, et al., "Multiscale Regularized Reconstruction for Enhancing Microcalcification in Digital Breast Tomosynthesis", Optical Sensing, II, vol. 8313, Feb. 23, 2012.

Wu et al "Tomographic mammography using a limited number of low-dose cone-beam projection images", Medical Physics, vol. 30, No. 3, Mar. 2003.

* cited by examiner

DEPTH-ENHANCED TOMOSYNTHESIS RECONSTRUCTION

CROSS REFERENCE TO RELATED APPLICATIONS

This application is the U.S. National Phase application under 35 U.S.C. § 371 of International Application No. PCT/EP2017/062073 filed May 19, 2017, published as WO 2017/202712 on Nov. 30, 2017, which claims the benefit of European Patent Application Number 16171075.1 filed May 24, 2016. These applications are hereby incorporated by reference herein.

FIELD OF THE INVENTION

The present invention relates to an image processing system, image processing method, to an imaging arrangement, to a computer program element and to a computer readable medium.

BACKGROUND OF THE INVENTION

Tomosynthesis enables limited-angle tomographic imaging with good "in-plane" (that is, orthogonal to a central projection direction), but poor depth resolution. The relatively small tomographic angle results in blurring of structures, which appear as "out-of-plane" (that is, in depth direction along the central projection direction) artifacts in neighboring slices. Diagnostically relevant structures such as lesions are well defined (or "delineated") in-plane but are in general difficult (if at all) to be delineated through-plane.

Moreover, due to the limited-tomographic angle problem, there typically exist several solutions, which are all consistent with the measured projection data. In other words, an iterative tomosynthetic reconstruction algorithm may converge to any one of these solutions, but convergence does not necessarily mean that the solution arrived at is a realistic image of the imaged object.

SUMMARY OF THE INVENTION

There may therefore be a need for novel system and related method to address some of the above mentioned shortcomings in the imaging art.

The object of the present invention is solved by the subject matter of the independent claims where further embodiments are incorporated in the dependent claims. It should be noted that the following described aspect of the invention equally applies to the image processing method, to the imaging arrangement, to the computer program element and to the computer readable medium.

According to a first aspect there is provided an image processing system, comprising:

an input interface for receiving i) a (first) 3D input image volume previously reconstructed from projection images of an imaged object acquired along different projection directions and ii) a specification of an image structure in the input volume;

a model former configured to form, based on said specification, a geometric 3D model for said structure in the input 3D image volume, the 3D model having a depth; and a volume adaptor configured to adapt, based on said 3D model, the input image volume to so form a 3D output image volume.

According to one embodiment, the system comprises a reconstructor configured to reconstruct a new image volume based on said output image volume. Specifically, the output image volume is envisaged for use as an initial image in an iterative reconstruction algorithm.

The proposed method and system is of particular advantage in small tomographic angle imaging. This is because in these imaging applications there is a pronounced lack of depth resolution which can be at least partially compensated for by including geometrical prior knowledge in relation to the structures observed in the input volume. Modifying the image information in the first input volume to include into the depth information as per the model allows encouraging the (in particular iterative) reconstructor to converge towards a better, that is, more realistic solution compared to starting the iterative reconstruction from a standard image such as a uniform image.

This allows combating an effect frequently encountered in limited angle tomography where (iterative) reconstruction algorithms have been observed to converge away from an optimal solution. The reason for this is that in particular high contrast sub-objects (within the imaged object) whose depths are unknown (such as lesions, calcification in mammography or foreign objects residing in the anatomy such as wires and needles during interventions) have the tendency to propagate artifact structures into neighboring slices. This may result in the iterative reconstruction algorithm converging to an unrealistic solution in particular when the reconstruction is started from standard initial images other than the ones proposed herein.

The proposed system uses a priori information about the size of a structure to improve definition of this structure in a depth direction and hence to reduce image artifacts that would arise from this structure in a standard iterative reconstruction without starting from the specially tuned initial image as proposed herein. The proposed system further allows increasing the contrast-to-noise ratio of an underlying structure in the focal plane.

Although the adapted output volume is mainly envisaged for use as an initial image to start the iterative reconstruction, other uses are also envisaged such as displaying on a monitor device for training purposes.

In one embodiment the image structure is specified in a (single) plane of the input model but specifications across multiple planes (such as in through plane view in tomosynthesis volumes) are also envisaged. In other words, the specification may designate a 3D sub-volume within the input volume. Once the structure is specified, the model former operates to form the 3D model based on the specified image structure in the plane or sub-volume. The model may be formed or generated graphically, as an explicit Surface in 3D but may also be defined merely implicit by a functional expression.

According to one embodiment, the adapting of the 3D input volume by the volume adaptor comprises changing at least one image value within the 3D model whilst maintaining a consistency of the so adapted 3D input volume with at least one of the projection images.

According to one embodiment, the forming of the 3D model by the model former comprises extending the specified image structure within the input volume along one of the different projection directions.

According to one embodiment, the forming of the 3D model by the model former comprises fitting a shape primitive to the specified image structure.

According to one embodiment, the shape primitive is an ellipsoid. This allows modeling in particular calcifications and lesions in mammography applications.

According to one embodiment, the reconstruction includes tomosynthetic reconstruction.

According to one embodiment, the image structure is representative of i) an anatomy in the imaged object, or ii) a formation in the imaged object or iii) a foreign part resident in the imaged object during imaging. "Foreign parts" includes for instance implants, wires, needles, catheters etc, or other (medical) tools that reside within the imaged object. "Anatomy" includes in particular a breast lesion, a calcification, a milk duct in a mammal breast, etc. "Formation" or deposit includes a spiculated lesion, an architectural distortion, etc.

Although the examples listed herein relate mainly to a mammography context (chiefly envisaged herein), this is not to be construed as excluding applications of the proposed system to the imaging of other parts of the human or animal body.

According to another aspect there is provide an imaging arrangement, comprising:
a system of any one of the previous embodiments, and
an imaging apparatus configured to acquire the projection images.

According to one embodiment, the imaging apparatus is a mammography or breast tomosynthesis imaging apparatus.

According to another aspect, there is provided an image processing method, comprising the steps of:
receiving i) a 3D input image volume previously reconstructed from projection images ($\pi$) acquired along different projection directions of an imaged object and ii) a specification of an image structure in the input volume;
based on the specification, forming for said structure a geometric 3D model (m) in the input 3D image volume, the 3D model having a depth; and
based on said 3D model, adapting the input image volume based on said 3D model to so form a 3D output image volume.

According to one embodiment, the method comprises:
performing a reconstruction based on said output model image volume.

According to one embodiment, the adapting of 3D input volume comprises changing at least one image value (voxel) within the input volume based on the generated model whilst maintaining a consistency of the so adapted 3D input volume with at least one of the projection images. Specifically, images value(s) enclosed by the model is/are changed.

According to one embodiment, the specification of the image structure is performed in a plane of the input volume, and wherein the 3D model is formed based on the image structure in said plane.

According to one embodiment, the forming of the 3D model comprises extending the specified structure within the input volume along one of the different projection directions.

According to one embodiment, the forming of the 3D model comprises fitting a shape primitive to the specified structure.

According to one embodiment, the shape primitive is an ellipsoid.

According to one embodiment, the reconstruction includes tomosynthetic reconstruction.

According to one embodiment, the reconstruction is iterative and the output image volume is used as an initial image in the iterative reconstruction.

According to another aspect there is provided a computer program element, which, when being executed by a processing unit (PU), is adapted to perform at least one of the steps in the method as per any one of the above mentioned embodiments.

According to another aspect there is provided a computer readable medium having stored thereon the program element as mentioned above.

Definitions

"3D" (3D dimensional volume) as used employs is to be understood broadly as image material including depth information which may be incomplete. A 3D volume as used herein comprises at least two views in different planes, that is, at different depths in the imaging region.

BRIEF DESCRIPTION OF THE DRAWINGS

Exemplary embodiments of the invention will now be described with reference to the following drawings wherein.

DETAILED DESCRIPTION OF EMBODIMENTS

Figure 1:
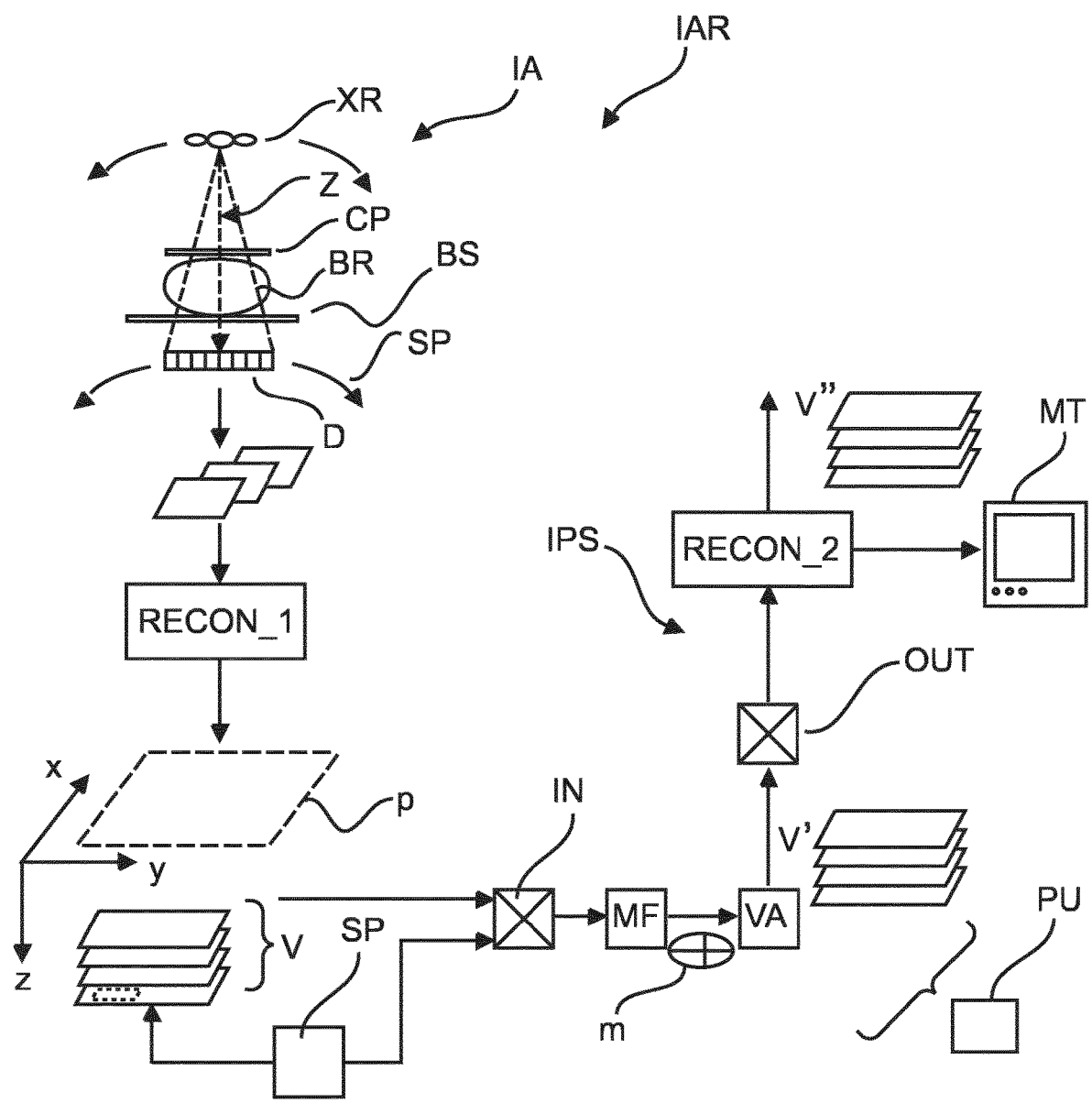
FIG. 1 shows a schematic block diagram of an imaging arrangement.

With reference to FIG. 1, there is shown a schematic block diagram of an x-ray based imaging arrangement IA.

The imaging arrangement IA comprises an x-ray imaging apparatus IA such as mammography imaging equipment. The imaging arrangement further comprises an image processing system IPS broadly configured to process imagery generated by the imaging apparatus IA.

The x-ray imaging apparatus IA comprises an X-ray source XR and an X-ray sensitive detector D. The x-ray source XR is configured to emit x-ray radiation that passes in a beam through an examination or imaging region and is then incident on an x-ray sensitive surface of the detector D. The detector D is in particular a digital detector such as a flat panel detector or a line detector or other. In the imaging region between the x-ray source and the detector there is a recess portion with a breast support BS and a compression plate CP.

The object BR to be imaged, such as the human breast, resides during imaging on the breast support BS and is compressed with the compression plate CP to enhance image contrast. The imaging apparatus IA is configured to produce depth resolved or "3D" imagery. This is achieved by acquiring projection imagery $\pi$ of the breast from different projection directions around a central projection direction Z, as shown in FIG. 1.

The ability to acquire imagery $\pi$ along different projection directions is implemented in one embodiment by a static flat panel detector D and an x-ray source XR, which is configured to acquire x-ray imagery $\pi$ along different projection directions by exposing the breast from different angular positions of the x-ray source, which travels along a circular arc. At suitably defined angular increments along this arc, respective projection images ($\pi_i$, with subscript "i" denoting the respective projection direction) are acquired by operating the X-ray source. That is, the detector D is sequentially exposed to the x-ray radiation beam whilst the source is travelling from above past the object BR.

This ability to acquire imagery $\pi$ along different projection directions is implemented in another embodiment by having the detector D, which consist of several line detectors, together with the x-ray source XR arranged on a rigid arm (scan arm), which is moveable across the breast, for example the rigid scan arm may rotate around a pivot point on the central direction below the detector D.

During imaging acquisition the detector D, which in one embodiment comprises the several line detectors, and the x-ray source XR travel past the object to be imaged BR in a motion plane on a limited angle arc centered about the central projection direction Z. Similar to the embodiment with static 2D detector, the set of projection images π is obtained. The projection data π may be re-ordered after acquisition. Although the above described imaging geometry embodiments are preferable, any other suitable imaging geometry is also envisaged herein, so long as the projection imagery is acquired from different directions suitable for tomosynthesis.

The x-ray radiation interacts with matter in the breast BR and is accordingly modified. This modified radiation is then incident on the detector sensitive surface and is converted into electrical signals. These electrical signals are then digitized by suitably configured AD-circuitry into respective (digital) projection images. Traditionally the mode of contrast as encoded in the projection images is that of absorption where the electrical signals are modulated according to the amount of attenuation experienced by the x-ray radiation in its passage through the tissue of the imaged object BR. However, this is not to exclude other contrast modes such as phase contrast or small angle scatter (also known as "dark field"). In these two later cases the imaging apparatus IA further includes in one embodiment an interferometer to help encode in particular these two other modes of contrast.

The projection imagery π can be reconstructed by a reconstruction algorithm into different images (also referred to herein as "views"), representing the absorption (or phase contrast, or small angle scatter) property of the breast BR at different depths z along the central projection direction Z. Specifically, these "in-plane" views or slices are situated on different image planes p (only one is shown in FIG. 1) at said different depths z within the imaging region as measured from the focal spot or from the detector surface. The image planes p (with axes X,Y) in which the views are reconstructed are perpendicular to the motion plane in which the detector travels.

The collection of these "in-plane" slices, reconstructed for different depths z, forms a 3D volume V. The individual slices can then be graphically rendered by suitable visualization software on a display device such as a monitor MT. The visualization software maps the individual image or voxel values onto a suitably chosen color or grey value scale to so help visualize image contrast by different colors or grey values.

The user (such as radiologist) can select by a suitable user interface any one of the different in-plane views in the volume V for visualization.

Other views are also obtainable from the image volume V, for instance by defining sectional planes through the volume V. Examples are "through-plane" views X,Z or Y,Z by the radiologist. These through-plane views are sections through the volume V perpendicular to the image planes p and are perpendicular to each other. As will become apparent further below, through-plane views are usually hampered due to the poor depth resolution in limited angle tomography but the proposed image processing system IPS allows improving said depth resolution.

Turning now in more detail to the image processing system IPS, this is specifically configured in one embodiment to operate as a two pass reconstructor. Specifically, in a first reconstruction by a first reconstruction unit RECON_1, the projection imagery π is reconstructed into a first volume V, using any known reconstruction algorithm. The output of the first pass reconstruction will be referred to herein as the first input volume V (for reasons that will shortly become apparent) and this volume V is received at an input port IN of image processing system IPS. Another input includes a specification of an image structure in this input volume V. The specification can be defined with a specification tool SP, operable by the user through a user interface, preferably graphical. For instance, the specification tool comprises a pointer tool such as a mouse or stylus or other. First, the user first selects a specific view of the volume, preferably in in-plane view although a through-plane may also be used in some embodiments, and this is view is then visualized on a screen. The user then delineates an image structure of interest. The specification tool may also free-hand-drawing selection of the structure of interest or may include automatic selection features. An exemplary embodiment is a "bounding box" based system where the user operates the pointer tool to define a rectangle or other bounding curve to enclose an area that includes the image structure of interest. A geometrical fitting operation is then performed automatically by fitting shape primitive (ellipse or other) to the image structure enclosed by the bounding curve. This helps specifying image structures with fuzzy or frayed border portions in which case a free-hand specification would be difficult to do. The respective co-ordinates of the selected voxels are then intercepted by an event handler to define a coordinate-specification of the image structure. Alternatively, instead of manually specifying the structure by the user, fully automatic embodiments are also envisaged where an automatic segmentation algorithm is used to effect the image structure specification. The input volume V and the specified image structure may or may not be received at the same time at the input port IN and the system may not necessarily use a single input port IN but may comprise instead different input ports IN1, IN2 (not shown) for receipt of the volume and specified image structure, respectively.

The proposed imaging system is configured to broadly fashion, based on this input volume V, a new volume V' which is then used as input for a second pass reconstruction to so arrive at an improved reconstruction V". The new input volume V' incorporates prior geometric knowledge, in particular depth information, about the image structure in the first input volume V. More specifically, the first volume V, as will be described in more detail below, is modified into the second input V' and this is then again input in the same or a different reconstruction unit RECON_2. The second reconstruction unit RECON_2 preferably implements an iterative reconstruction algorithm. The first input volume is modified to better define a depth extension of the image structure within the volume V along Z. This allows formulating a more accurate input volume as it has been observed by Applicant that an iterative reconstruction, starting from this second, modified input volume will converge in general more quickly to a more accurate or realistic reconstruction V" with better through-plane resolution than the earlier, first pass, reconstruction V.

Yet more specifically and with continued reference to the block diagram of the imaging processing system IPS, a model former MF operates on the received input volume V to define a 3D model m for the specified image structure within the first input volume obtained by the first reconstruction unit RECON_1. RECON_1 uses any tomosynthetic reconstruction algorithm to reconstruct a first volume V from the projection data π. The model m is formed so that it has the specified image structure as one of its cross sections.

A volume adapter VA then uses the so defined 3D model m to modify the input volume V to arrive at the second volume V' which is then output at output interface OUT. This modified volume V' is then forwarded to the second reconstruction module RECON_2. The second reconstruction module RECON_2 uses an iterative reconstruction algorithm to reconstruct an improved depth resolution volume V" from the projection imagery π, using the modified input volume V' as an initial image. The improved volume V" can then be stored in an image storage and/or can be otherwise processed, in particular can be rendered for a view on the display device MT.

In general, tomosynthetic reconstruction algorithms as envisaged herein are usually formulated as an optimization problem in terms of an objective function. The task is to minimize (or maximize) the objective function by iteratively adapting voxel values, starting from an initial image. For the first pass reconstruction of the first input volume V, the initial image may be chosen as a uniform image populated with zeros or with other standard values. However, in the second pass reconstruction, the depth information improved second input volume V' is used as the initial image. As such, for the proposed system, any iterative tomosynthetic reconstructions can be used. Different tomosynthetic reconstruction algorithms have been previously described for instance by Tao Wu et al in section F in part II and section E in part III in their "Tomographic mammography using a limited number of low-dose cone-beam projection images", published in Medical Physics, vol. 30, No. 3 (March 2000), all of these techniques being envisaged herein in different embodiments.

The iterative tomosynthetic reconstruction (briefly referred herein as the iterative reconstruction) iterates through a number of intermediate image results to finally arrive at a final output of an image reconstruction, based on the measured projection images π. During the reconstruction, intermediate image results are forward projected and compared with the actually measured projection images π. A deviation, if any, is established and this deviation is then penalized by the objective function. The course of the iteration is usually controlled by adding to the objective function a regularizer term that enforces certain desired smoothness characteristics of the solutions. Still, because of the limited angle tomography, the knowledge of the image structures within the image to be reconstructed is by necessity limited. Therefore the solution space for the optimization problem in general comprises an infinite number of different possible solutions (that is, possible candidate images) that would each explain or fit the same given projection data set π. Unlike in the first pass reconstruction, it is proposed herein to use in the second pass reconstruction the dedicated tailored input image V' that incorporates prior geometric knowledge about shape and depth extent of the image structures that are expected in the solution volumes. This prior "depth knowledge" may be based on anatomic knowledge or other knowledge about the geometric sub-objects to be found in the object of interest that will give rise to known image structures. For instance, the general shape of certain formations, deposits, etc. within the beast BR may be known and thus shape or extent of image structures representing these formations or deposits can be predicted. For instance, in mammography it has been found that shapes of micro-calcifications or cystic lesions formed in the breast tissue can be well approximated by using ellipsoidal primitives. Elliptic image structures may thus be expanded in 3D into ellipsoids fitted to these elliptic cross sections. Other ways of constructing 3D models for image structures within the input model are also envisaged.

Using the second input model V' preloaded with geometrical prior knowledge as the initial image in the second pass reconstruction amounts to restricting the solution space. Said differently, the iterative reconstruction algorithm in the second pass is provided with clues to more quickly converge to more accurate and realistic results.

The two reconstructor modules RECON_1 or RECON_2 may be combined into a single one so the same reconstruction algorithm is used for the reconstruction of V and V", but in each case a different initial image is used: V' is used in RECON_2 as the initial image whilst RECON_1 uses a standard image as initial image such as a "zero image" pre-populated with zeros or other uniform image.

The image processing system IPS can be run wholly on a work station or other general purpose computing device PU associated with the imager IA. As an alternative to this, implementation in a distributed computing architecture is also envisaged, where the system IPS serves a plurality of imagers IA or where the tasks of at least one or all of the components are outsourced to other computing units in the network.

Both, online or offline embodiments are envisaged herein for the image processing system. In the online embodiment, the IPS is interfaced to the imager IA and the volume are reconstructed as described in essentially real-time as the projection images π are being received from the imager IA. In the offline embodiment, the acquired projections π are first stored in a memory such as in PACS (picture archiving and communication system) of a HIS (Hospital Information Systems) or in other data storage systems. The projection images π are then accessed on demand at any time after their acquisition and are then reconstructed into volumetric image data as described herein.

At least one or all components of the image processing system IPS may be arranged in hardware such as in a suitably programmed FPGA (field-programmable-gate-array) or as a hardwired IC chip. For instance, the imaging control system SC may be integrated as a control module into the imaging apparatus IA.

Figure 2:
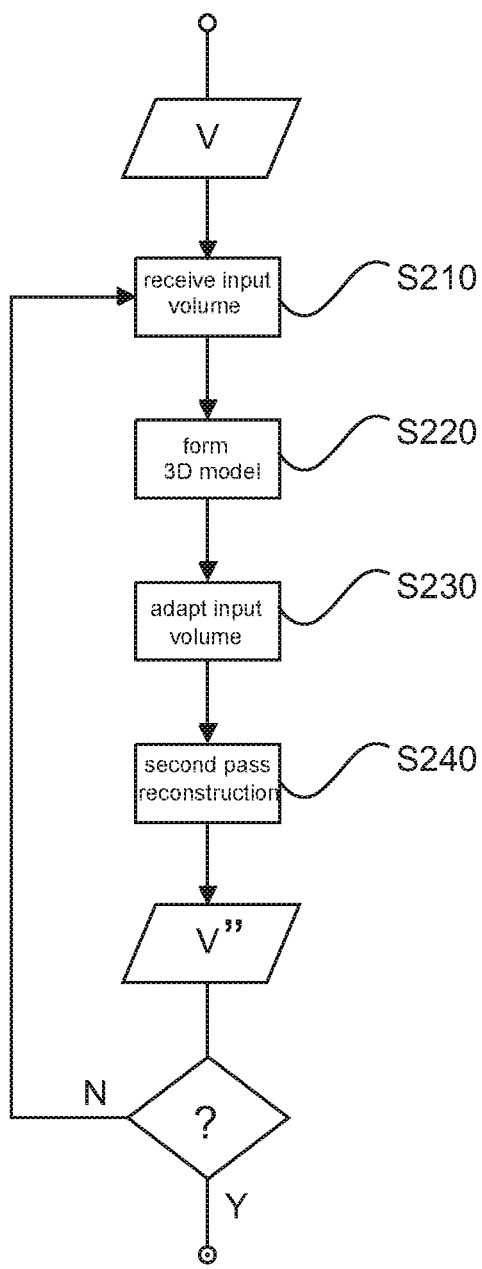
FIG. 2 shows a flow chart of an image processing method.

Operation of the image processing system IPS will now be explained with reference to FIG. 2 where a flow chart for a corresponding image processing method is shown. However, it will be understood that the steps in flow chart FIG. 2 are not necessarily tied to the architecture of the image processing system as per FIG. 1 but that the teachings of the flow chart can also be understood as a standalone teaching in its own right.

At step S210 the first 3D input volume is received. This has been previously reconstructed in first pass reconstruction from projection images π acquired by a scan imager IA along different projection directions of the image object BR such as the human breast. The projection imagery has been acquired in a limited angle tomographic geometry. In particular, the projection imagery π has been collected in an arc around the image object substantially less than 360°, in particular less than 180°, yet more particular along an arc that is less than 10% or 20% of 180°. Any arbitrary reconstruction algorithm such as shift-and-add or other FBP (filtered backward projection) based variants can be used for the first pass reconstruction step. Preferably, an iterative reconstruction algorithm is used.

In addition to this input volume reconstructed in the first pass, a specification of an image structure in the first pass reconstructed input volume is received. These two items of information, that is, the first reconstructed volume V' and the specified structure therein, may not necessarily be received concurrently. In particular, image structure specification may be received after the first input volume V is received as input.

At step S220, a 3D model m is then formed from the specified structure in the first pass reconstructed input volume V' and used as an estimate of the spatial extent of the true underlying structure in the following The specified structure may be particularly comprised of co-ordinates of a shape, such as an ellipse, circle or otherwise that forms a contour of the image structure of interest. The specification of the image structure may be generated by a human user by delineation using graphical user interface equipment with a point tool or other interactive methods. For instance, the specification may be performed by defining a bounding box around the voxel positions one wishes to specify as explained above in relation to the specification tool SP. Alternatively, the image structure may be generated fully automatically by operation of a segmentation algorithm that processes the input volume V.

This knowledge includes in particular an estimate about the depth extent of the selected image structure through the input volume. The 3D model generated in step S220 is particularly a surface 3D structure such as an ellipsoid or other suitable geometric primitive whose intersection is formed by the delineated structure. In an alternative embodiment, the 3D model m is defined non-graphically by an implicit function, such as $(x/a)^2+(y/b)^2+(z/c)^2=1$, for the exemplary case of an ellipse. Explicit surface definition may thus not be necessary for the definition of the model.

The specification of the structure from which the 3D model is formed may be designated in any suitable view. Preferably, the structure is specified in an in-plane view as the spatial resolution of structures focused in these planes is in general good. An in-plane slice selected for specification of imager structure therein may also be referred to herein as a (current) focal plane with the user changing "focus" as he or she scrolls from slice to slice to specify (eg delineate) contours of image structures. However, in other embodiments the structure is specified in a through-plane view such as in the X,Z or Y,Z plane. The specification may be confined to a single plane (so is essentially a 2D specification) as in a single in-plane view but may be done instead in 3D through a plurality of planes as in through-plane view.

In step S230 the input volume V is then adapted based on the 3D model to so arrive at an improved output image volume V' that now incorporates better defined structures whose depth information is encoded into the adapted voxel value distribution. As explained in more detail below at the discussion of FIG. 3, the volume adaptation step S230 operates in the imaging domain and not in the projection domain. Voxel values in the volume V' are adapted to populate volume portion enclosed by the model with higher values than in the neighborhood of the model to counteract the intrinsic blurring of limited angle tomography along the depth direction by using the generated model as a constraint on the spatial extent of the specified structure and hence to achieve better contrast and thus better through-plane definition.

At step S240 a second pass reconstruction is performed based on the adapted volume V'. More particularly, the second pass reconstruction is performed as an iterative reconstruction using the adapted input volume V' as an initial image from which the one or more iterations starts.

It is not necessary herein that the same iterative reconstruction is used for the first pass in step S220 and the second pass in step S240, although using the same iterative algorithm in both passes is the preferred embodiment. If an iterative reconstruction is used in the first pass, this may well differ from the iterative scheme later used in the second pass. For instance, the regularizer function, if any, can be changed in the second pass reconstruction or parameters (such as the regularizer strength coefficient) of the objective function of the second pass reconstruction algorithm may otherwise be modified. A random image or a uniform image (where all voxel are prepopulated with constant values, such as zeros in a "zero image") can be used as initial image in the first pass reconstruction to obtain the first input volume V.

Referring back to the step of forming the 3D model for delineated or specified structure in the input volume a number of different embodiments are envisaged herein. Specifically, the 3D model specified is mainly envisaged as a 3D surface model defined within the confines of the initial volume V. This can be done by considering the specified structure as a specific cross section in the plane(s) in which the specification has been performed. The 3D surface model m is one (preferred) embodiment of the result m of the model generator MF, which allows to derive for each voxel within the specified image structure an estimated spatial extent along one projection direction (either the z-axis, i.e. parallel projection, or the direction of the central projection, i.e. perspective projection).

As mentioned briefly above, alternative to the specification of the 3D model m as a surface in 3D, the model m may also be described as a functional relation between the in-plane-coordinates (x,y) of the delineated structure and its spatial extent in the depth direction (z). Furthermore, the 3D model may be described implicitly, i.e. as the set of all points (x,y,z) which satisfy a certain functional relation $f(x,y,z)=0$.

According to one embodiment of the model forming step S220, the specified structure is simply extended along the central projection or depth direction +Z and/or −Z through a set number of slices. This then defines a cylinder having the specified structure as its cross section. The delineated structure is essentially copied into the set number of neighboring slices either in both depth directions (+Z and −Z) or in only one depth direction +Z or −Z. A refinement of this embodiment is to have the number of copies depend on the image values with the bounding box of the specification. Specifically, and in one embodiment, the number of copies (of the original structure) that is to be used for the extension into the volume V along a spatial direction is a function of the size of the bounding box of the delineated structure in the one or more slices perpendicular to said spatial direction. More generally, the 3D model is a function of the area size of the delineation of the image structure in the focal plane. In other words, the larger the delineated structure the larger its height (depth extension) along Z. As further refinement of this and according to one embodiment, the height (along Z) of the 3D structure is computed for each voxel position inside the delineated region in the focal plane as a function of the distance of the voxel position from the barycenter of the region and/or the spatial extent (for example bounding box) of the region in the focal plane.

In another embodiment of this model forming step S220, the specified structure is extended in +Z and/or minus −Z direction, but the structure's cross section is gradually shrunk to a point linearly with distance from the plane in which the specification has been performed. In other words, a double cone model structure is formed this way, having the specified structure as its common base.

In another embodiment, as a refinement of the above, a defined geometric primitive is used. This is based on prior knowledge about the shapes of certain sub-objects such as deposits, formations that are known to be present within the object during imaging. The sub-objects residing within the object during imaging may include medical tools such as catheters, needles etc, each having a priori known geometric properties, such as shape, length, diameter, etc. A generic geometric shape, or primitive, such as an ellipsoid is then fitted to the cross section as specified by the user or by the segmentation algorithm. For instance in one embodiment, the specified structure is an ellipse. In mammography, this may be understood in one embodiment to be a cross-section of an ellipsoidal mass lesion, cyst, or calcification and an ellipsoidal primitive is then fitted to this cross section. The specification of the structure in the given plane determines two of the three ellipsoidal axes, the third axis is then estimated by the model generator, for example as the maximum ellipsoidal axes of the two in-plane parameter. The assumption that underlies this estimation has been observed to be well justified in mammography because of the compression of the breast tissue during image acquisition. With these three parameters, the ellipsoidal equation can be evaluated for every point inside the specified structure to so specify in-depth extension of the ellipsoid based on its ellipse cross section as specified in a plane of the first input volume V. Other ways of defining the 3D model within the input volume are also envisaged herein, so long as depth information is added into the input volume that was not previously explicit. It is envisaged in one embodiment that shape primitives for a-priori known sub-objects (such as inserts) can be pre-selected by the user in a graphical user input arrangement, such as a menu structure from which the applicable shapes can be selected by a mouse-click operation or similar interactive action option. This allows streamlining the model generation step in the first pass reconstruction V by using the additional prior information on the insert's shape.

Figure 3:
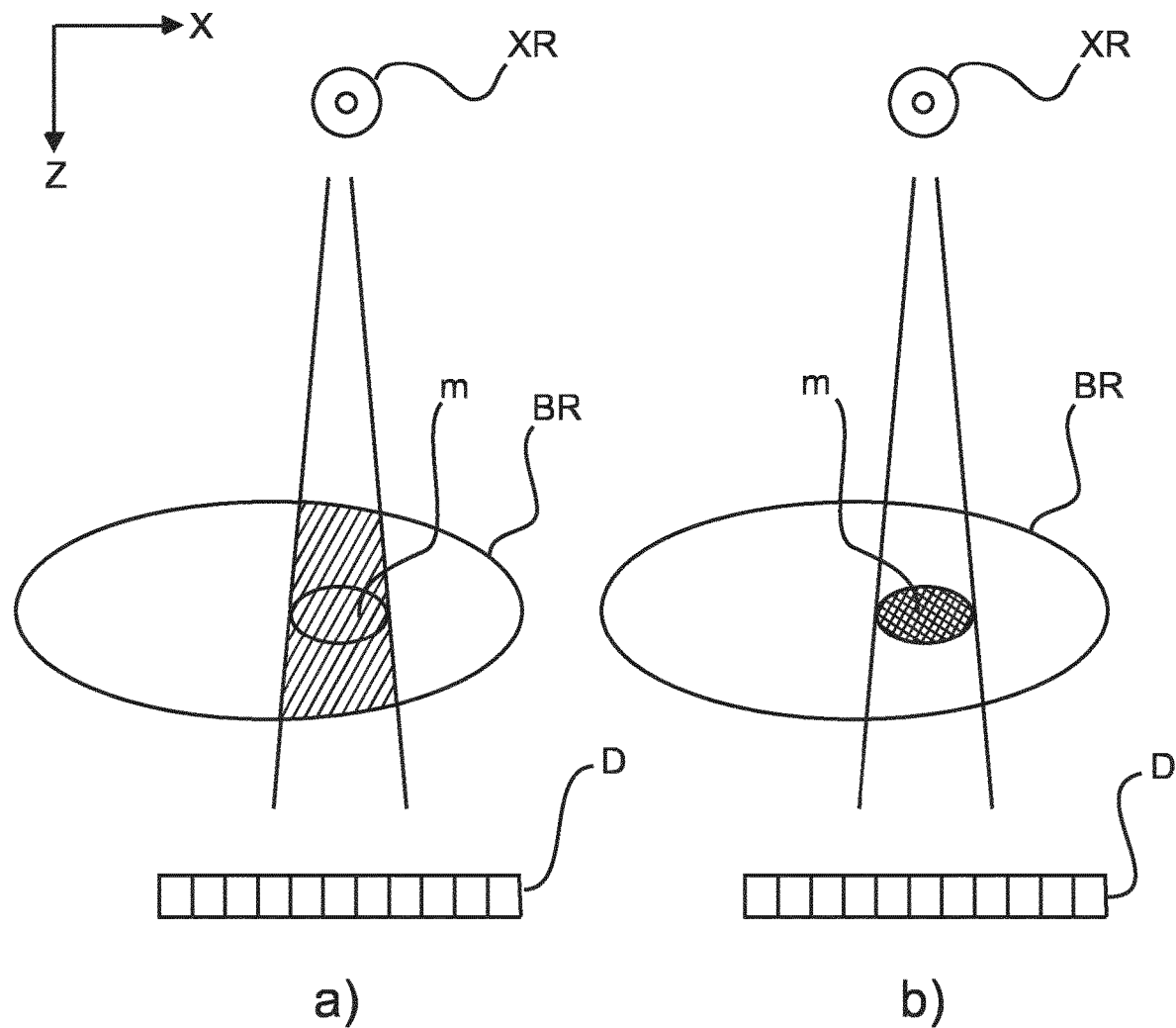
FIG. 3 shows through plane views of an object of interest.

Reference is now made to FIG. 3 to explain in more detail the input volume adaptation step S230 and operation of the volume adaptor VA. FIGS. 3a), b) show respective through plane views (in particular in X,Z section, but this is of course not limiting) of the respective volumes, namely the input volume V in FIG. 3A and the improved prior knowledge enriched volume V' after performing the adaptation step S230 on the input volume V of FIG. 3a).

More specifically and referring first to the input volume V in FIG. 3a), image information (that is, voxel values) within the sub-volume enclosed by the previously formed 3D model m appears spread out through a bundle of geometrical rays (along a given projection direction and emanating from the focal spot position) that partly envelopes the model volume m. This spreading out of image information is due to missing information from projection directions outside the angular span of the limited-angle acquisition trajectory. This insufficient information results in a poor depth resolution, i.e. a lack of knowledge about the extent of the image structure as designated by model M.

FIG. 3b) now shows the same view for the same projection direction through the input volume V after adaptation. As can be seen, the larger voxel values are now concentrated within the confines of the 3D model m. This concentration of image value magnitude within the 3D space enclosed by the model m is achieved by a balancing operation. That is, whilst an image value at a voxel position within the model m is increased, an image value at voxel position outside the model, but still within the considered projection ray bundle, is decreased accordingly to so maintain the balance. More specifically, for any change at a voxel in the model, there is a counterpart change at at least one counterpart voxel somewhere outside the model but on the projection ray (of the bundle) through said voxel in the model and the focal spot XR. In one embodiment, only a single counterpart model voxel is changed on the ray outside model m. The location of this single counterpart voxel on the ray is entirely arbitrary, so long as it is outside the model m. Alternatively, this change is uniformly applied in proportion to a plurality (for instance, all) voxels along the ray outside model m. The change at the voxel in the model is hence off-set by the counterpart change outside the model along the ray. This re-balancing operation is necessary in order to encode depth information into the volume V but to still maintain consistency with the projection image $\pi_i$ acquired in the considered projection direction i.

Alternative embodiments for the adaption step S230 are also envisaged, where the change of voxels values is performed by decreasing the values for voxels inside the model and to correspondingly increase the values for voxels on the ray outside the model. This alternative embodiment may be advantageous for lung imaging where the image structures may correspond to air enclosures within surrounding homogenous lung tissue.

As envisaged in the embodiment of FIG. 3, the projection direction in respect of which the image value re-balancing operation is performed is that of the central projection direction but this is not necessarily limiting as other projection directions may be considered instead. In other words, because of the re-balancing operation, the depth information is now encoded into the input volume but the forward projection through the ray bundle enclosing the model still equals the measured projections π even though the voxel information has been rearranged or exchanged to increase (at least on average) the image values for voxel positions enclosed by the model m. Yet more particularly, an average attenuation value of normal breast tissue is computed or selected according to a data acquisition protocol. Such a value can be computed for example by averaging the attenuation values in the first pass reconstruction in an area outside the delineated structure that does not lie within a projective bundle that corresponds to the projection direction under consideration. Next, the attenuation values of voxels in the first pass reconstructed volume V that are located outside the 3D model m, but are still within said projection cone are replaced with the average attenuation of normal breast tissue. Next, for each geometrical ray in the cone that passes through the 3D model m, voxels along this ray inside the 3D model are replaced such that the line-integral along this X-ray path remains constant (i.e. equals the original measurement as per the projection image $\pi_i$ for the projection direction i under consideration).

It will be appreciated, that the volume adaptation step S230 as shown schematically in FIG. 3 can be applied for more than one projection directions. Parallel projections or central projections (as shown in FIG. 3) are each envisaged for performing adaptation step S230. However, it has been found to be sufficient and computationally cheap if the adaption step S230 is performed merely for a single projection direction. Preferably, it is performed along the main projection direction Z as shown in FIG. 3 but this is not limiting.

When the volume adaption step S230 is to be applied whilst enforcing consistency with more than one projection direction the computational cost is expected to increase. A separate optimization loop (different from the optimization for the iterative reconstruction operation in step S240) may be set up with a separate objection function F to achieve consistency with the more than one (in particular all) projection directions. For instance, the objection function for the input volume adaption step S230 may be formed as the square sum of deviations from the respective projection images π for the respective directions to be considered.

Formally, this separate objective function for adaptation step S230 can be written as $$F=\Sigma_i[FP_i(\mathrm{mod}(V))-\pi_i]^2,$$

wherein:

i runs over the desired projection directions to be considered (this may include all or a sub-set of all projection directions), $FP_i(.)$ is the forward projection operator for direction i, mod(.) is a modification of the voxel values within the ray bundle that partly envelops the model m in V to effect the re-distribution as explained above, and wherein πi is the projection image recorded for direction i in the acquisition.

One then optimizes using a suitable numerical technique (least gradients, Newton-Raphson etc) to find for the distribution of voxel values concentrated within the model m for which this square sum is minimal. Other objective function formulations may also be used instead. The geometrical operations in relations to the casting of rays through different voxel positions, the definition of the model m, etc, as used and described above are well defined as the imaging geometry is assumed known (in particular the location of the focal spot and the location and orientation of the detector D are known for all projections i) and the reconstructed volumes are defined in a coordinate frame of the imager IA. The geometrical operations can be implemented by using analytical geometry packages of numerical computing suites, with non-limiting examples including Matlab™, Maple™ or Mathematica™ or others or by using general programming languages such as C, C++ or others.

Although with the proposed method a plurality of input volumes V can be processed, in one embodiment only a single input volume V is used as obtained from the earlier reconstruction RECON_1.

Figure 4:
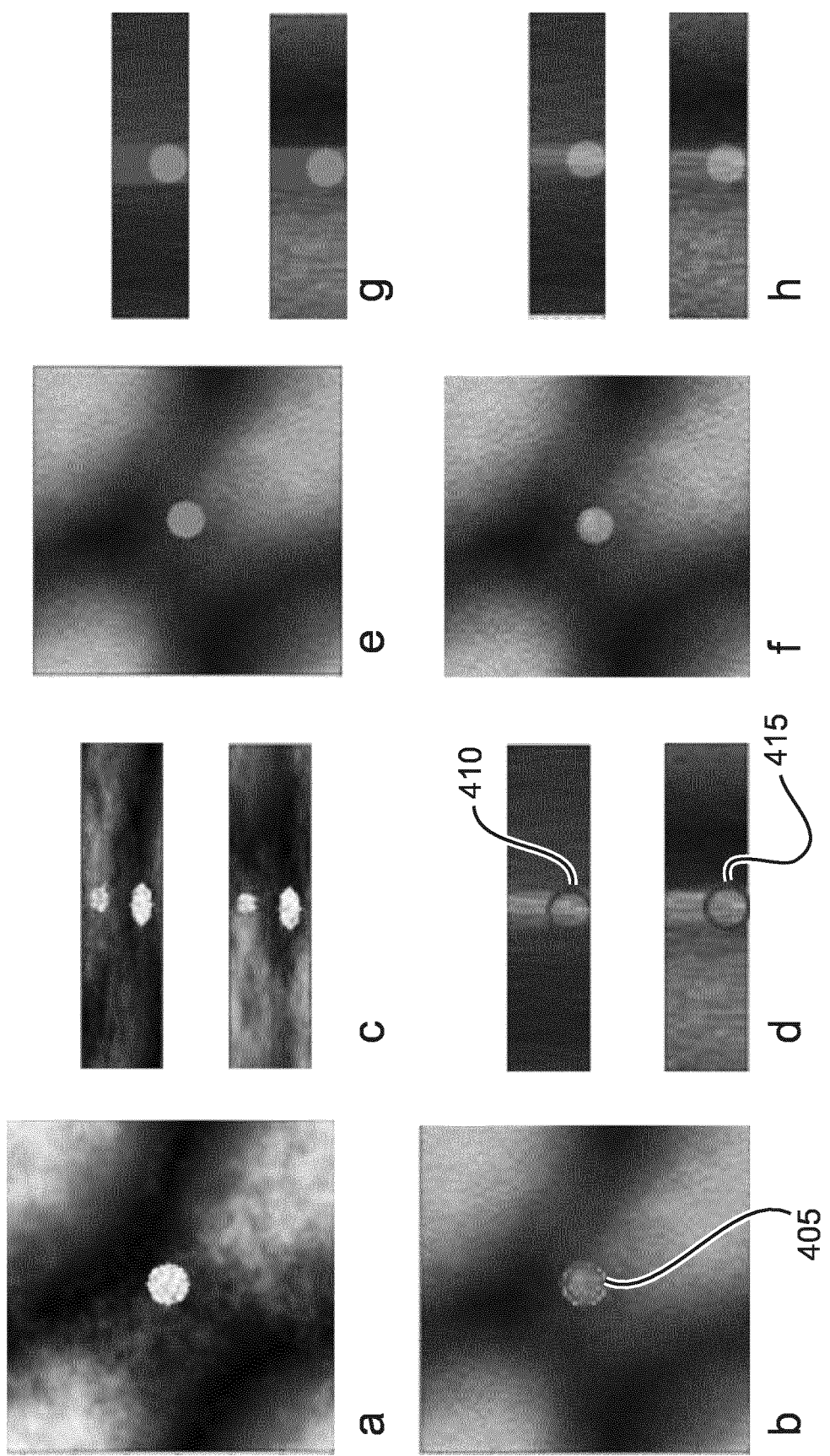
FIG. 4 shows exemplary imagery obtainable by the proposed method or system.
Figure 5:
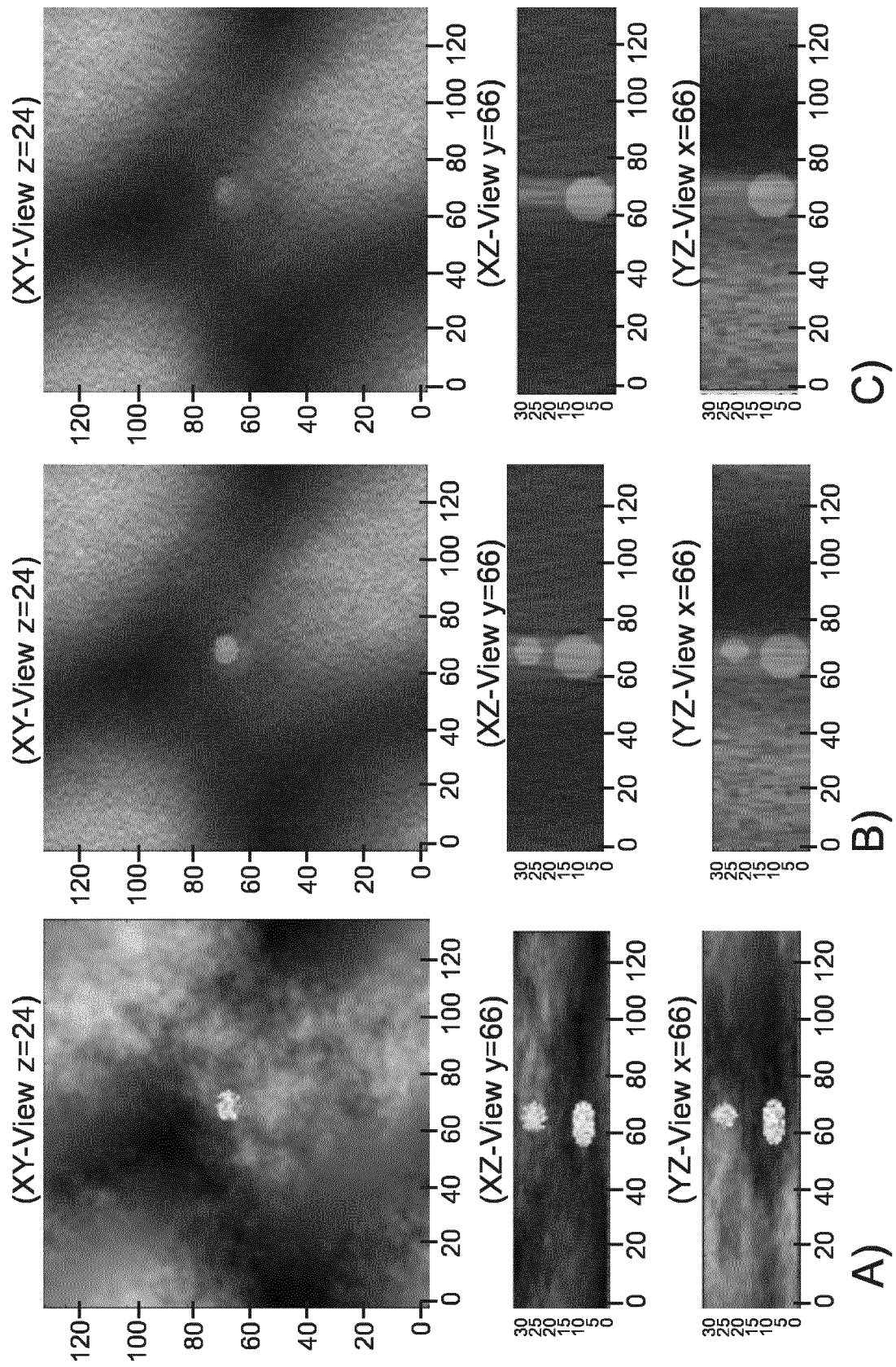
FIG. 5 shows further exemplary imagery obtainable by the proposed system or method.

Reference is now made to FIGS. 4-6 where exemplary imagery and results achievable with the proposed image processing system IPS and/or method as per the flow chart in FIG. 2.

Referring first to FIG. 4, this illustrates the proposed method using a phantom with mammographic background texture into which two ellipsoidal inserts are embedded. Based on an in-plane annotation of the larger ellipsoid, a 3D model is estimated and a prior start image is generated for the subsequent depth-enhanced reconstruction to reduce tomosynthesis-artifacts induced by the large ellipsoid in the focal-plane of the smaller ellipsoid. Specifically, three orthogonal views of the true phantom are shown, with (a) being an in-plane view for a given depth z and (c) being the two through-plane views X,Z and Y,Z. A first pass reconstruction is shown in-plane in (b) together with a user-annotated in-plane contour 405 alongside the two through-plane (d) extensions 410,415. From this model, the second input volume V' is generated (e) with through-plane views (g) and this is used as an initial image for the second pass iterative reconstruction. The output volume V" is shown in-plane (f) along its two through-plane views X,Z and Y,Z (h), together evidencing enhanced depth-resolution and higher in-plane signal definition of the image structure.

FIG. 5 shows a repeated application of the proposed method to extend the two-pass reconstruction into a three-pass one. Specifically, in a subsequent step after reconstruction of V' in pass two, the small ellipsoid was additionally annotated in its focal plane and a prior image was generated, now using both models, one for the small and one for the large ellipsoid. FIG. 5 illustrates a clear improvement of the visibility of the small ellipsoidal as well as a clearer 3D depth definition even in the through-planes. Specifically, the proposed method is applied a second time in relation to the small ellipsoid. Orthogonal in-plane views of the true phantom through the second ellipse with the two through-plane views are shown in left column A). A better visibility of the small ellipsoid in the "$3^{rd}$ pass" depth enhanced reconstruction as evidenced in middle column B) where two models are used, one for the small ellipsoid and one for the larger ellipsoid. For comparison, right column C) illustrates a result achieved by a single application of the proposed method in which only a single estimated lesion model was used, namely a model for the large ellipsoid.

In other words, as illustrated in FIG. 5, the proposed method and the operation of the processing system IPS can be repeated by using the improved reconstruction V" as the next input volume. Because of the better depth resolution in V", more details will emerge. This allows the user to refine the earlier specification into two or more distinct (sub-) image structures previously indiscernible in the first input volume V'. In other words, the proposed method may be extended from a two pass reconstruction scheme into an n(>2)-pass reconstruction with repeated feedback of the volumes V"$^{(n)}$ produced at output port OUT, back into input port IN, with repeated and accumulative specification of additional image structure(s). This optional feedback is shown in flow chart FIG. 2 in operation box designated "?".

Although the above has been explained with main reference to mammography this is not limiting as other x-ray based volumetric imaging methods with limited angular acquisition (that is those with measurements collected along an arc subtended by an angle substantially less than 180°) are also envisaged in other embodiments. The proposed method allows compensating for the lack of structural depth information from which these limited angle (tomographic) imaging techniques suffer. In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium (in particular, but not necessarily, a non-transitory medium), such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An image processing system, comprising:
   a processor and memory configured to:
   receive i) a 3D input image volume previously reconstructed from projection images of an imaged object acquired along different projection directions and ii) a specification of an image structure in the input volume;
   form, based on said specification, a geometric surface 3D model for said structure in the 3D input image volume, the 3D model having a depth;
   adapt, based on said 3D model, the input image volume to so form a 3D output image volume; and
   reconstruct a new image volume based on said 3D output image volume.

2. The system of claim 1, wherein the adapting of the 3D input volume by the processor comprises changing at least one image value within the 3D model whilst maintaining a consistency of the so adapted 3D input volume with at least one of the projection images.

3. The system of claim 1, wherein the specification of the image structure is performed in a plane of the input volume, and where the processor is configured to form the 3D model based on the image structure in said plane.

4. The system of claim 1, wherein the forming of the 3D model by the processor comprises extending the specified image structure within the input volume along one of the different projection directions.

5. The system of claim 1, wherein the forming of the 3D model by the processor comprises fitting a shape primitive to the specified image structure.

6. The system of claim 5, wherein the shape primitive is an ellipsoid.

7. The system of claim 1, where the reconstruction includes tomosynthetic reconstruction.

8. The system of claim 1, wherein the reconstruction is iterative and the output image volume is used as an initial image in the iterative reconstruction.

9. The system of claim 1, wherein the image structure is representative of i) an anatomy in the imaged object, or ii) a formation in the imaged object or iii) a foreign part resident in the imaged object during imaging.

10. An imaging arrangement, comprising:
    a system of claim 1, and an imaging apparatus configured to acquire the projection images, wherein the imaging apparatus is in particular a mammography imaging apparatus.

11. An image processing method, comprising:
    receiving i) a 3D input image volume previously reconstructed from projection images acquired along different projection directions of an imaged object and ii) a specification of an image structure in the input volume;
    based on the specification, forming for said structure a geometric surface 3D model in the 3D input image volume, the 3D model having a depth;
    based on said 3D model, adapting the input image volume based on said 3D model to so form a 3D output image volume; and
    performing a reconstruction of a new image volume based on said 3D output model image volume.

12. A computer program element embedded in a non-transitory computer readable medium, the program element, when being executed by a processor, is adapted to perform a method comprising:
    receiving i) a 3D input image volume previously reconstructed from projection images acquired along different projection directions of an imaged object and ii) a specification of an image structure in the input volume;
    based on the specification, forming for said structure a geometric surface 3D model in the 3D input image volume, the 3D model having a depth;
    based on said 3D model, adapting the input image volume based on said 3D model to so form a 3D output image volume; and
    performing a reconstruction of a new image volume based on said 3D output model image volume.

* * * * *